Figure 1:
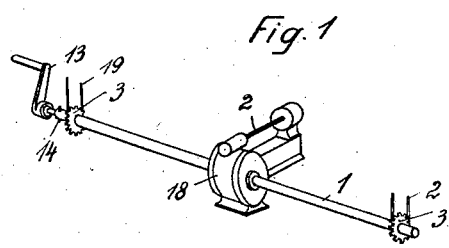

May 17, 1932.  A. HESS ET AL  1,858,624
MECHANISM FOR OPERATING FOLDING MOTOR CAR TOPS
Filed July 22, 1930

Inventor:
Arnold Hess and
Emil Hess
by Karldenham
Atty.

Patented May 17, 1932

1,858,624

UNITED STATES PATENT OFFICE

ARNOLD HESS AND EMIL HESS, OF SOLOTHURN, SWITZERLAND

MECHANISM FOR OPERATING FOLDING MOTOR CAR TOPS

Application filed July 22, 1930, Serial No. 469,888, and in Germany July 27, 1929.

Our invention relates to mechanism for operating folding motor car tops in which manual and mechanical means are provided for alternative operation, the mechanical means being disabled upon operation of the manual means, and in which a rod is mounted in the hollow drive-shaft with means for disabling either the mechanical or manual device at will. In these devices, in which couplings have to be used capable for operation in both directions of rotation, it is impossible to shift said rod by hand, as the friction between the clutch-pins and holes still exists even after the motor of the mechanical drive has come to rest. It is the object of our invention to overcome this drawback by providing helical grooves in the boss of the hand-crank cooperating with lugs fixed on the drive shaft, the pitch of said helical grooves being such that the axial thrust onto the rod in the hollow drive shaft is high enough to throw out the clutch by rotating the hand-crank after placing same on the outer end of said hollow shaft.

In the drawings affixed to this specification and forming part thereof a mechanism embodying our invention is illustrated diagrammatically by way of example.

Figure 2:
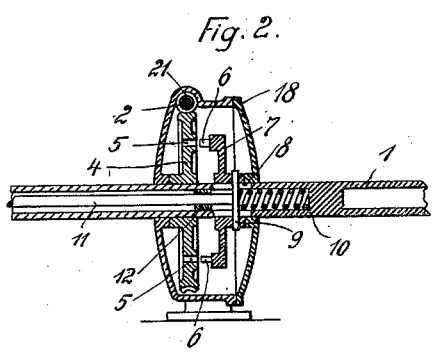
Figures 3, 4:
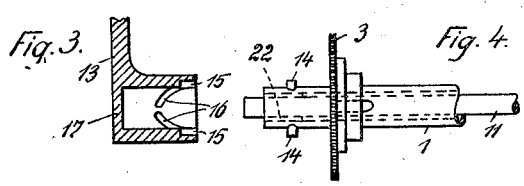
Figure 5:
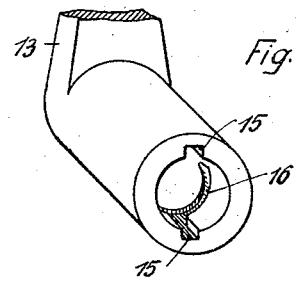

In the drawings,

Fig. 1 is a perspective illustration showing the operating shaft and the means for rotating it, Fig. 2 is a section on the axis of the clutch casing, drawn to a larger scale, Fig. 3 is a section showing the boss of a crank for rotating the operating shaft, Fig. 4 is an elevation showing the end of the operating shaft on which the crank is adapted to be secured, and Fig. 5 is a perspective illustration showing the boss of the crank, viewed from its inner end.

Referring now to the drawings and first to Fig. 1, 1 is the partly hollow operating shaft, 2 is a shaft to which rotation is imparted from the engine through any suitable gearing, (not shown), 18 is a casing which surrounds the clutch for rotating the shaft 1; 3, 3 are sprockets at the ends of the shaft 1 with chains 19 and 20 for folding the top and 13 is a crank for manually rotating the shaft 1.

Referring now to Fig. 2, 21 is a worm which is secured on the shaft 2, and 4 is a worm wheel in mesh with the worm which is mounted to rotate freely on the shaft 1 within the casing 18. 5, 5 are holes in the body of the worm wheel 4, and 6, 6 are pins on a clutching member 7 which are adapted to enter the holes 5, 5. The clutching member 7 is mounted to slide on the shaft 1 but held against rotation thereon by a pin 9 in its boss which is fitted to slide in slots 8 of the shaft 1. 10 is a spring which tends to urge the clutching member 7 toward the worm wheel 4, 11 is a rod which is inserted in the shaft 1, fitted to rotate in a sleeve 12 near the slots 8 and in a sleeve 22 near the outer end of the shaft, and abutted against the pin 9 at its inner end. Fig. 2 shows the clutching member 7 disengaged from the wheel 4, but normally the clutching member is held engaged with the wheel by the spring 10. The length of the rod 11 is so determined that its outer end projects beyond the outer end of the shaft 1 when the clutch is thrown in, as shown in Fig. 4.

14, 14 are lugs on the outer end of the shaft beyond the adjacent sprocket 3, 15 are parallel grooves in the boss of the crank 13 which are adapted to receive the lugs 14, and 16, 16 are helical grooves extending in opposite directions from the ends of the grooves 15.

In operation, when the crank 13 has been placed on the outer end of the shaft 11 until the lugs 14 are at the outer ends of the parallel grooves 15, 15, and ready to enter one of the helical grooves 16, and the crank is rotated in a given direction for erecting, or in the opposite direction for holding the top, it is displaced axially until the web 17 at the end of the crank boss engages against the outer end of the rod 11 and pushes the rod into the shaft 1, throwing out the clutching member 7.

As the helical grooves 16 extend at either side of the parallel grooves 15, the clutch is thrown out whenever the crank is rotated.

We wish it to be understood that we do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

We claim:

1. A mechanism for operating folding motor car tops comprising a hollow operating shaft, manual and mechanical means for rotating said shaft, a clutch forming part of said mechanical means, a rod inserted in said hollow shaft and adapted to throw out said clutch, automatic means for throwing in said clutch and lugs for cooperating with helical grooves in the boss of the hand crank so as to throw out said clutch by rotating the hand crank after placing same on the outer end of said hollow shaft.

2. A mechanism for operating folding motor car tops comprising a hollow operating shaft, manual and mechanical means for rotating said shaft, a clutch forming part of said mechanical means, a rod inserted in said hollow shaft and adapted to throw out said clutch, automatic means for throwing in said clutch, and lugs for cooperating with helical grooves in the boss of the hand crank, the pitch of said helical grooves being so that the axial thrust onto said rod which presses against the clutch member is high enough to throw out said clutch by rotating the hand crank after placing same on the outer end of said hollow shaft.

3. A mechanism for operating folding motor car tops comprising a hollow operating shaft, manual and mechanical means for rotating said shaft, a clutch forming part of said mechanical means, a rod inserted in said hollow shaft and adapted to throw out said clutch, automatic means for throwing in said clutch, one end of said rod projecting from said shaft when said clutch has been thrown in, lugs on said shaft for cooperation with parallel and helical grooves in the boss of the hand crank, the latter grooves extending in opposite directions from the ends of the parallel grooves, a web at the end of the boss of the hand crank engaging against the outer end of said rod, the pitch of said helical grooves being so that the axial thrust onto said rod which presses against the clutch member is high enough to throw out said clutch by rotating the hand crank after placing same on the outer end of said hollow shaft.

4. A mechanism for operating folding motor car tops comprising a hollow operating shaft, manual and mechanical means for rotating said shaft, a clutch forming part of said mechanical means, a rod inserted in said hollow shaft and adapted to throw out said clutch, automatic means for throwing in said clutch, one end of said rod projecting from said shaft when said clutch has been thrown in, two lugs on said shaft for cooperation with two parallel and two helical and left- and righthand grooves in the boss of the hand crank the latter helical grooves extending in opposite directions from the ends of the parallel grooves, a web at the end of the boss of the hand crank engaging against the outer end of said rod, the pitch of said helical grooves being so that the axial thrust onto said rod which presses against the clutching member is high enough to throw out said clutch by rotating the hand crank after placing same on the outer end of said hollow shaft.

In testimony whereof we affix our signatures.

ARNOLD HESS.
EMIL HESS.